United States Patent [19]
Goodwin

[11] 3,730,001
[45] May 1, 1973

[54] AUTOMATIC WORKING LIQUID SAMPLER FOR PROVIDING LIQUID SAMPLES FOR SPECTROGRAPHIC WEAR ANALYSIS

[76] Inventor: Richard Rohland Goodwin, 8604 Battailles, Annandale, Va. 22003

[22] Filed: Feb. 8, 1972

[21] Appl. No.: 224,458

[52] U.S. Cl. ............................. 73/422 R, 73/422 TC
[51] Int. Cl. .............................................. G01r 1/10
[58] Field of Search ......................... 73/421 R, 421 B, 73/422 R, 422 TC

[56] References Cited

FOREIGN PATENTS OR APPLICATIONS 1,079,994   8/1967   Great Britain .......................... 73/422
205,302   0/1968   U.S.S.R. ................................ 73/422

*Primary Examiner*—S. Clement Swisher
*Attorney*—Eric P. Schellin

[57] ABSTRACT

A system which takes a sample of a working liquid in a machine for subsequent study, such as by spectrographic analysis. The sample is taken after a predetermined amount of machine usage has accumulated. The system comprises accumulating means for recording machine usage and providing a control output which activates a sampling means to take a sample of the working liquid. Delay means are preferably incorporated to assure that the sample is representative of the overall condition within the machine of the working liquid being so sampled.

7 Claims, 5 Drawing Figures

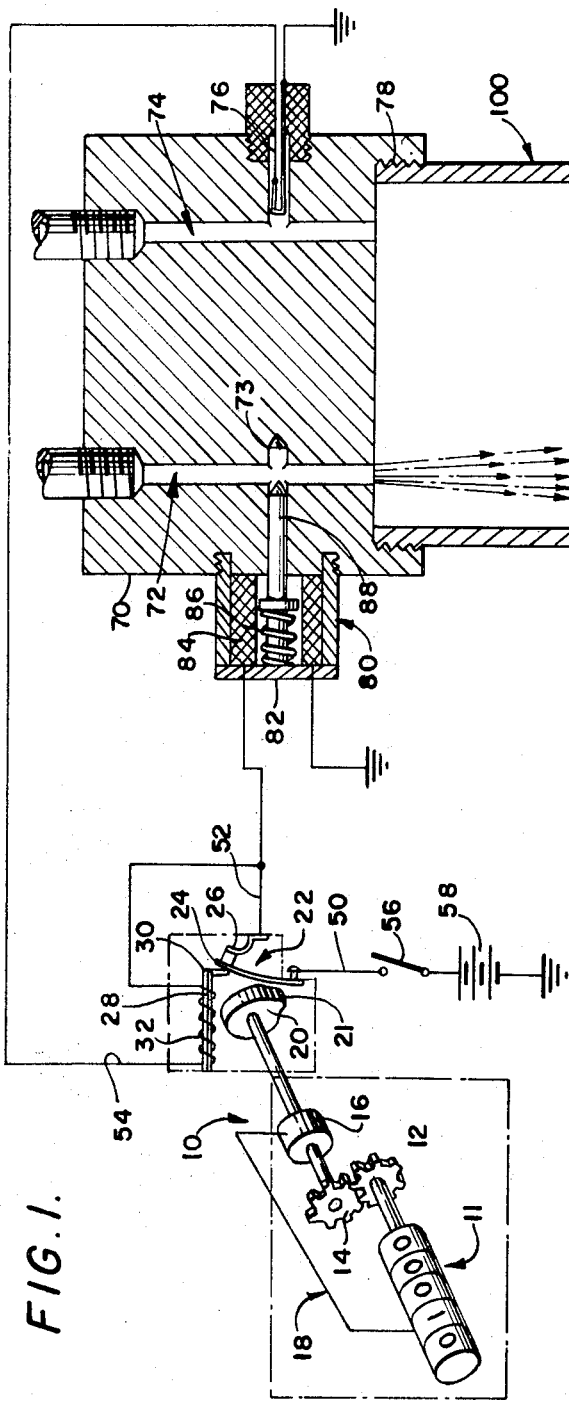
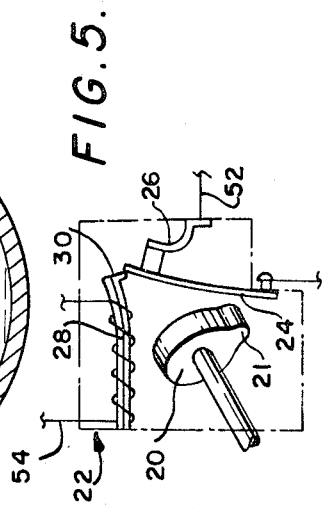
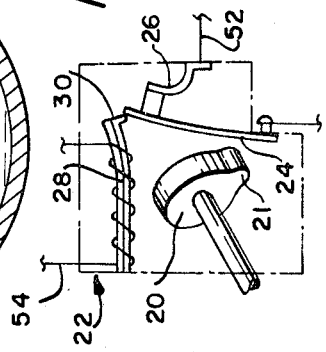
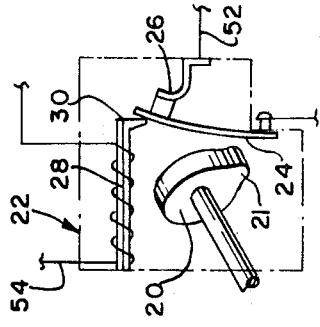
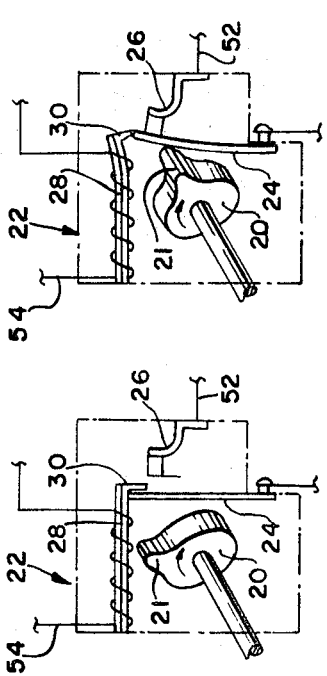

AUTOMATIC WORKING LIQUID SAMPLER FOR PROVIDING LIQUID SAMPLES FOR SPECTROGRAPHIC WEAR ANALYSIS

BACKGROUND OF THE INVENTION

1. Field of the Invention

This invention relates to the field of liquid sample taking.

2. Prior Art

Spectrographic analysis of oil samples from an automobile engine or other machine has been developed as a means of determining the condition of the machine. The spectrographic analysis determines the quantity of wear metals and other contaminants present in a working liquid such as lubricating oil. The quantities of the various contaminants present provide a basis for accurate prognostication of the machine's remaining useful life.

These techniques are mainly used by operators of large fleets of motor vehicles, particularly trucks. Fleets generally have enough vehicles to make statistical sampling effective for predicting the performance of the whole fleet. The expense of spectrographic analysis is much more than offset by the prevention of losses caused by breakdowns on the road.

Oil samples for spectrographic analysis have been taken by attendants inserting hand sampling devices into the oil dipstick tube and withdrawing a sample of the crankcase oil. Even though this has been the best technique available, it is rampant with problems which cause inaccuracies in the subsequent spectrographic analysis. For example, the vehicle in question may be out on the road when a sample needs to be taken, or the vehicle may come into the yard when no attendant is available to take a sample.

Samples taken at varying times after an engine has been shut off give different spectrographic results because the contaminants, especially the wear metals, settle out of the oil when the oil is not circulating. Even if an attendant if available to sample the oil at the proper time, the depth to which the hand sampling device is inserted into the crankcase influences the composition of the sample obtained.

In order for the spectrographic analysis to provide accurate results, the samples must be representative of the liquid as a whole. Such samples are best obtained by sampling a homogeneous body of the oil. The prior art has not been able to produce consistently accurate spectrographic results, because it can not guarantee that the sample is taken from a homogeneous body of the liquid to be sampled and thus can not assure that the sample is representative.

To solve these sample taking problems, an automatic sampling system which produces repeatable results is needed.

Prior art automatic liquid sampling devices have been attached to stationary pipelines and are designed to take periodic samples of the liquid flowing therethrough for subsequent analysis. These systems have been used in oil fields and central milk receiving plants. These sampling systems are cumbersome and operate in continuous flow situations. Unfortunately, these prior art systems do not meet the requirements for sampling the working liquid in machines, such as motor vehicles, since machines are often mobile and are subject to intermittant use.

OBJECTS

A primary object of this invention is to obtain homogeneous samples of the working liquid in internal combustion engines and other machines.

Another object of the invention is to obtain samples of working liquids in machines after a predetermined usage of the machine even though there is no attendant available at the time a sample needs to be taken.

Another object is to improve the accuracy of the spectrographic machine analysis by providing repeatable samples of the working liquid which is to be analyzed.

SUMMARY

These and other objects which will become apparent to those skilled in the art are accomplished by mounting an automatic sampling device on the machine to take samples of a working liquid such as lubricating oil in an internal combustion engine or hydraulic fluid in an automatic transmission. The sampling device incorporates accumulating means for accumulating a measure of machine usage and for providing a control output for activating a sampling means after a predetermined usage has accumulated.

The sampling means, once activated by the control output, allows the working liquid to flow into a sample container until the desired sample is in the sample container, whereupon the flow is terminated. In order to assure the homogenity of the sample, delay means are preferably provided to prevent a sample from being taken before the liquid has circulated in the machine long enough to have become homogeneous.

BRIEF DESCRIPTION OF THE DRAWINGS

FIG. 1 is an idealized view of the sampling unit, shown partially in cross section.

FIGS. 2 through 5 show different stages in the cycle of operation of the sampling switch.

DETAILED DESCRIPTION OF THE INVENTION

The sampling unit of this invention is comprised of an accumulating means for accumulating a measure of machine usage; and a sampling means for sampling a working liquid within the machine after a predetermined usage has accumulated; and preferably includes a delay means for assuring that the samples are taken from a homogeneous liquid.

For clarity in the following description, it will be assumed that the sampling unit is connected to an internal combustion engine to sample its lubricating oil. This description does not limit the types of machines to which the sampling unit is applicable, the only limitations being those set forth in the appended claims.

In the preferred embodiment which is shown in the drawings, the accumulating means is shown generally at 10 and comprises an odometer 11 which accumulates the number of miles traveled by the vehicle as a measure of machine usage. It will be understood that any other measure of machine usage, such as engine revolutions or hours of operation could be accumulated instead.

Odometer 11 has a gear 12 attached to its drive shaft for continuously driving a gear 14 which is rigidly attached to the input shaft of a one revolution clutch 16. Odometer 11 provides a control output on line 18 each time the thousands digit advances. The control output can be either mechanical, as by a lever, or electrical. An electrical output can be derived by providing an electrical circuit which is completed each time the units digit, the tens digit and the hundreds digit of the odometer are all zero simultaneously.

The clutch output shaft has a cam 20 fixed thereto and having a lobe 21 for closing a latching sampling switch 22 each time clutch 16 engages to rotate its output shaft. Therefore sampling switch 22 is closed once each 1,000 miles of vehicle travel.

Sampling switch 22 is comprised of a contact bar 24 which is operated by cam 20, a spring contact 26 and an electrically insulated bimetalic latch 28 having a latching prong 30 at its end. A heating coil 32 surrounds latch 28.

Contact bar 24 is connected by a wire 50 to the vehicle ignition switch 56 which connects wire 50 to the vehicle battery 58 when the engine is running.

Spring contact 26 is connected by a wire 52 to one end of heating coil 32 and to a valve solenoid 84 in a sampling housing 70. The second end of coil 32 is connected by wire 54 to a thermostat 76 in housing 70.

Sampling housing 70 has a liquid inlet passage 72, an outlet passage 74 and a removeable sample container 100 threaded into a socket 78. Sample container 100 connects inlet 72 to outlet 74. A solenoid valve 80 is threaded into housing 70 to control flow of the liquid through the inlet passage, and a thermostat 76 is threaded into housing 70 to sense the temperature of the liquid flowing through outlet passage 74.

Solenoid valve 80 is comprised of a housing 82 containing the valve operating solenoid 84, a valve return spring 86 which biases the valve closed and a valve stem 88 for controlling the flow of liquid through the inlet passage.

Oil inlet 72 is connected to a source of the working liquid to be sampled. This source is preferably pressurized by the machine's normal operation, thus assuring liquid flow, without the necessity of providing a pump as part of the sampling system.

There are several places where the sampling system can be installed on existing internal combustion engines such that inlet 72 is connected to a source of lubricating oil under pressure.

First, the source of oil can be the hole in the engine block in which the oil pressure sending unit is installed. A Tee is then used to connect the oil pressure sending unit. The outlet passage 74 can be returned to any lower pressure point in the oil system, such as the oil inlet pipe, the oil pan, or a hole in a rocker arm cover.

Another source of oil would be a hole drilled into one of the passages in which the oil is under pressure. The outlet would then be returned as above.

A third location for the sampler is at the oil filter. A spacer can be installed between the oil filter and the engine. This spacer can provide both a source of oil and a return path for the oil. Inlet 72 is thereby connected to the inlet side of the oil filter and outlet 74 is connected to the outlet side of the oil filter.

In future engines, the above connection methods can be used, or the sampling system can be built into the engine.

If the machine from which the samples are to be taken is an automatic transmission, inlet 72 can be connected to a Tee in the fluid line from the transmission to the radiator and outlet 74 can be connected to the return line from the radiator. Alternatively, the inlet can be connected to one of the test taps which are used for measuring pressures during the adjustment of the transmission.

In other machines, inlet 72 will be connected to a point where the working liquid to be sampled is under pressure and outlet 74 will be connected to a lower pressure point.

OPERATION

This sampling unit is designed to take a sample every 1,000 vehicle miles. Each time the thousands digit of the odometer advances, line 18 provides a control output which engages one revolution clutch 16. The engaged clutch drives cam 20 through a single revolution.

In FIGS. 1, 4 and 5 cam 20 is shown in its rest position, where it remains whenever clutch 16 is disengaged. The beginning of the cam rotation cycle is illustrated in FIG. 2, where the cam has begun to turn, but cam lobe 21 has not yet engaged contact bar 24 which is in its rest position, with sample switch 22 open.

As cam 20 rotates further, lobe 21 engages bar 24 forcing it toward spring contact 26. As bar 24 moves toward contact 26, the free end of bar 24 slides along the underside of latch prong 30, forcing latch prong 30 upward and flexing latch bar 28 as shown in FIG. 3. As cam 20 rotates further, contact bar 24 engages spring contact 26, closing sampling switch 22. Thereafter prong 30 slips off the end of bar 24 and latch 28 snaps back to its rest position.

As cam 20 rotates to its rest position (with lobe 21 out of contact with bar 24) latch prong 30 keeps contact bar 24 and spring contact 26 engaged to retain sampling switch 22 in its closed condition, as shown in FIGS. 1 and 4.

When contacts 24 and 26 engage to close switch 22, current flows from battery 58 through ignition switch 56 and sampling switch 22 to valve solenoid 84 and from there to ground. The current through solenoid 84 builds up a magnetic field which overcomes spring 86 and retracts valve stem 88 from valve seat 73, opening the valve and allowing oil to flow into sample container 100. The sampling unit is shown in this condition in FIG. 1, where sample container 100 is half full of oil. When container 100 is full, oil flows up through outlet passage 74 and past thermostat 76 and back to the engine. Thermostat 76 quickly reaches the temperature of the oil in the outlet passage. If this temperature is above the thermostat temperature, the thermostat 76 closes, completing the circuit from switch 22 through heating coil 32 through thermostat 76 to ground. Heating coil 32 heats latch bar 28 until it bends enough for prong 30 to clear bar 24, which takes a few seconds.

As prong 30 clears bar 24, bar 24 snaps back to its rest position, opening switch 22. This stops the flow of current through coil 32 and valve solenoid 84. Once the current stops, the magnetic field in the solenoid collapses and valve return spring 86 forces valve stem 88 back into valve seat 73 stopping the oil flow and trapping the desired sample in container 100. The delay created by thermostat 76 and heating coil 32 is sufficient to assure that sufficient oil has passed through container 100 to assure that the sample is representative of the oil in the engine.

If the engine had been cold when the oil began flowing through outlet passage 74, thermostat 76 would have remained open until the oil temperature reached the thermostat's setting at which time thermostat 76 would have closed. Once thermostat 76 had closed, the operation would proceed as described above. By the time the oil reached the thermostat's temperature, the oil would have circulated sufficiently to have become homogeneous.

An attendant removes the sample container at a convenient time subsequent to the taking of the sample and replaces it with an empty sample container prior to the next time a sample needs to be taken. The full container is transmitted to a laboratory for analysis.

Although a thermostat is the preferred delay means for assuring that the oil mixture has become homogeneous prior to sampling, other delay means may be used. One such delay means is a timer which prevents the solenoid valve from closing until after the engine has been on long enough for the oil to have become homogeneous. If the accumulating means accumulates engine hours rather than vehicle miles, the delay can be provided by preventing the accumulating means from accumulating the first few minutes of operation following each starting of the motor. This will not significantly effect the analysis results on those vehicles such as long distance trucks which are normally run for many hours at a time. This type of delay mechanism assures that the oil has circulated sufficiently prior to the closing of the sampling switch and eliminates the need for a delay means which takes control after the sample switch is closed.

Using such a system, the valve can be closed after a predetermined time, such as by placing an E-cell in series with valve solenoid 84 or the valve can be closed when a predetermined quantity of oil has passed through the sample container or when the oil in the sample container has reached a predetermined level.

While the form of the sampling switch shown is preferred, it will be understood that many other forms may be used. Thus, rather than being cam operated, the switch could be closed by a solenoid. Contact bar 24 could be released by a solenoid rather than by the heating coil and the bimetalic latch. Alternatively, sample switch 22 could be replaced by a relay whose circuit is closed and latched by the control output and whose circuit is opened by the thermostat when oil in contact with the thermostat is above a predetermined temperature.

A further variation of the sampling system, although definitely not preferred, would be to allow the oil to flow through the sample container continuously until the predetermined usage has accumulated and then shut-off the flow.

While this invention has been described in connection with the preferred embodiment and variations thereof, those skilled in the art will recognize that there are many other variations which fall within the spirit of the invention and the scope of the appended claims.

What is claimed is:

1. Liquid sampling apparatus for taking a representative sample of a working liquid flowing in a machine, comprising:
   accumulating means responsive to machine usage for accumulating a measure of machine usage, said accumulating means providing a control output upon accumulating a predetermined usage, and;
   sampling means responsive to the control output for taking a sample of the working liquid flowing in the machine.

2. The apparatus of claim 1, further comprising:
   delay means for delaying the taking of the sample until the liquid composition has obtained a steady state condition.

3. The apparatus of claim 1 wherein the sampling means comprises:
   valve means responsive to the control output for allowing the liquid to flow into a sample container, and
   shutoff means for closing the valve means to retain the desired sample in the sample container.

4. The apparatus of claim 3 wherein the shutoff means is responsive to a condition of the liquid, whereby the valve means is closed when the liquid obtains a predetermined condition.

5. The apparatus of claim 4 wherein the shutoff means is a thermostat which is responsive to the temperature of the liquid to be sampled, whereby the valve means remains open until the liquid reaches a predetermined temperature.

6. A method of obtaining a representative sample of a working liquid flowing in a machine, comprising:
   accumulating a measure of machine usage;
   producing a control output when a predetermined usage has been accumulated, and;
   taking a sample of the working liquid in response to the control output.

7. The method of claim 6 wherein the step of taking a sample comprises:
   opening a valve in response to the control output to allow the liquid to flow into a sample container, and;
   closing the valve to trap the desired sample in the container.

* * * * *